United States Patent [19]

Hartel et al.

[11] 4,280,792
[45] Jul. 28, 1981

[54] AIR-COOLED TURBINE ROTOR SHROUD WITH RESTRAINTS

[75] Inventors: Edward O. Hartel, Orange; John N. Dale, Stratford, both of Conn.

[73] Assignee: Avco Corporation, Stratford, Conn.

[21] Appl. No.: 11,041

[22] Filed: Feb. 9, 1979

[51] Int. Cl.³ .......................................... F04D 29/38
[52] U.S. Cl. .................................... 415/117; 415/178; 165/169
[58] Field of Search ............... 415/117, 116, 115, 178, 415/139; 165/169; 60/260

[56] References Cited

U.S. PATENT DOCUMENTS

| | | | |
|---|---|---|---|
| 3,800,864 | 4/1974 | Houser et al. | 415/115 |
| 3,825,365 | 7/1974 | Peng | 415/116 |
| 3,864,199 | 2/1975 | Meginnis | 416/97 |
| 3,893,786 | 7/1975 | Rahnke et al. | 415/116 |
| 3,963,368 | 6/1976 | Emmerson | 415/115 |
| 3,981,609 | 9/1976 | Koenig | 415/117 |
| 3,990,807 | 11/1976 | Sifford | 415/136 |
| 4,017,207 | 4/1977 | Bell et al. | 415/115 |

FOREIGN PATENT DOCUMENTS

| | | | |
|---|---|---|---|
| 2555814 | 6/1976 | Fed. Rep. of Germany | 416/96 |
| 600025 | 3/1948 | United Kingdom | 415/178 |

*Primary Examiner*—Carlton R. Croyle
*Assistant Examiner*—Rae Cronmiller
*Attorney, Agent, or Firm*—Ralph D. Gelling

[57] ABSTRACT

A stationary air-cooled shroud or cylinder forming a portion of a turbine asembly includes an inner ring having a matrix of grooves formed therein, and an outer restraining ring covering the matrix so as to form a labyrinth of passageways for the flow of cooling air therethrough. A suspension ring cooperates with the inner ring and the restraint ring to define an entry flow path for the cooling air, and also a plenum chamber having an auxiliary outlet to provide film cooling air to the clearance spacing between the inner ring and the rotor blade tips. The fow of cool air through the labyrinth is operative to reduce the level and gradient of the metal tempertures in the shroud in order to obtain improved turbine blade tip clearance control.

25 Claims, 8 Drawing Figures

AIR-COOLED TURBINE ROTOR SHROUD WITH RESTRAINTS

The subject invention relates to a new and improved shroud for minimizing the clearance between blade tips and the surrounding shroud in a small gas turbine engine.

In order to achieve maximum turbine efficiency it is essential that the minimum clearance between the rotating blade tips and the shroud or cylinder be obtained at the various temperature levels at which the gas turbine engine operates. Accordingly, it is desirable to design the turbine components such that the thermal growth of the shroud and the blade tips be more or less parallel so as to maintain minimum tip clearance between the blades and the shroud. As is readily apparent, if the clearance is too tight, there is a potential for rubbing whereas, if the clearance is too wide, a loss of efficiency results.

Accordingly, it is the subject of the invention to provide a new and improved shroud or cylinder construction for the compressor turbine or power turbine of a gas turbine engine, which shroud includes means for ducting cool air through the shroud so as to localize the effect of the cooling air in the immediate area of the blade tip clearance region which is of critical importance for blade tip clearance control and thus efficient operation of the gas turbine engine.

It is a further object of the subject invention to provide a compressor turbine shroud having a unitary inner ring, which cooperates with a unitary outer restraining ring to define a labyrinth of passageways for conducting cool air therethrough for effecting improved turbine tip clearance control, and also to reduce the level and gradient of metal temperatures in the shroud, as well as attenuate thermal distortions from combustor hot spots, while maintaining the integrity of the shroud at higher gas temperatures.

It is a further object of the invention to provide a new and improved air-cooled shroud including means for providing a film cooling flow in the clearance between the blade tips and the shroud for further aiding in improving the efficiency of the gas turbine engine.

In the subject invention, a turbine assembly includes a stationary air-cooled shroud which extends over and is spaced from the tips of a plurality of blades of a rotor, such as the first stage gasifier turbine. The shroud or cylinder basically includes an inner ring, an outer restraining ring, and a suspension ring. The inner ring has a radially inner surface which is juxtaposed to and spaced from the rotating blade tips, while the outer surface of the inner ring has a matrix of grooves cut therein. The matrix includes a plurality of spaced, parallel, circumferential grooves extending generally perpendicular to the longitudinal axis of the inner ring. A plurality of interconnecting grooves is also cut into the outer surface of the inner ring and extends generally parallel to the longitudinal axis of the inner ring, with each intersecting groove providing communication between two adjacent circumferential grooves. The interconnecting grooves are staggered about the circumference of the inner ring. The outer restraining ring is concentric with and surrounds the inner ring so as to cover the matrix of grooves in the inner ring to define a labyrinth of air-cooling passageways. The suspension ring cooperates with both the inner ring and the outer ring to define an entry flow path as well as a plenum chamber for cooling air provided from the turbine compressor. The cooling air from the plenum chamber enters the entry flow path and is conducted through the labyrinth of circumferential and interconnecting groove passageways, thereby reducing the level and gradient of thermal expansion of the shroud in order to obtain improved blade tip clearance control. The clearance is controlled by virtue of the combined stress reaction of the inner cooled ring and the outer restraint ring, which may be assumed as line-to-line contact at assembly, but which could also be assembled with a slight gap or with an interference fit depending on the desired restraint between the members. It is noted that in addition to tip clearance control benefits, the cooled shroud will tolerate increased turbine inlet temperatures, which would otherwise not be possible with an uncooled shroud.

In an alternate embodiment, the labyrinth may include metering apertures extending between one of the circumferential grooves and the leading edge of the inner ring for providing film cooling to the inner radial surface of the inner ring, thereby further aiding in maintaining the tip clearance, and also aiding in purging hot gases at the leading edge of the shroud or cylinder.

The above and other objects and advantages of the invention will become apparent from a reading of the following detailed description taken in conjunction with the drawings in which.

Figure 1:
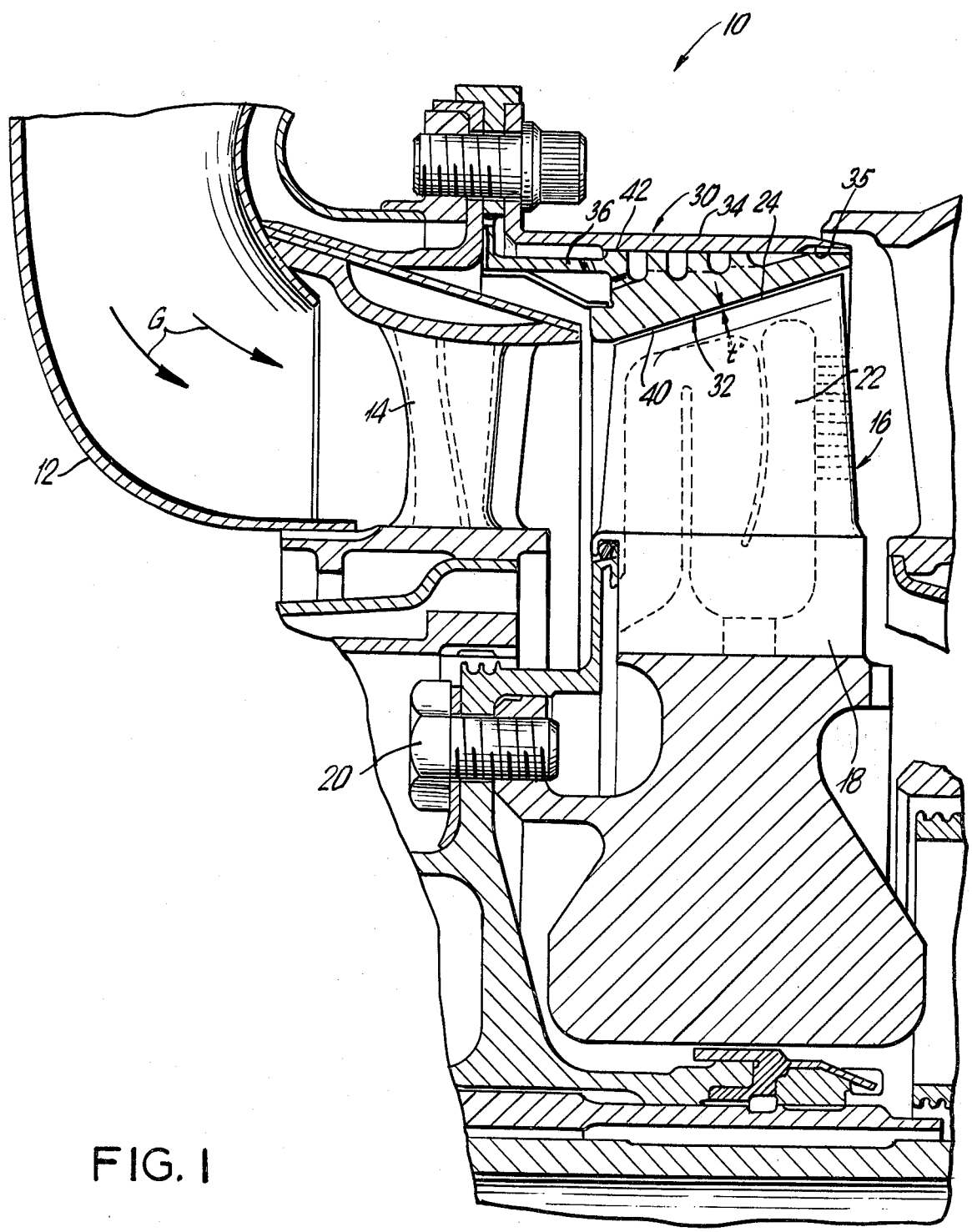
FIG. 1 is a partial sectional view through the first stage of a gas producer turbine embodying the air-cooled shroud of the subject invention.

Turning to FIG. 1, the first stage of a gas producer turbine is designated by the numeral 10 and is connected to the combustion chamber (not shown) by an annular combustor outlet 12. The combustion gases, designated by the arrows G, are provided to the turbine and initially encounter the first stage stator vanes 14, followed by the first stage blades 16 of the turbine rotor. Each rotating blade 16 includes a root portion 18 which is fixedly secured to the rotating assembly of the turbine as at 20, and further includes an airfoil-shaped portion 22, with the blade tip being designated by the numeral 24. The airfoil portion may include air cooling passageways, as shown by the dotted lines. Extending about and surrounding the first stage rotor blade 16 is the annular shroud or cylinder 30 which basically comprises an inner annular ring 32, an outer, annular restraint ring 34, and an annular suspension ring 36. Preferably, each ring 32, 34 and 36 is of unitary construction and extends around the entire periphery of the turbine rotor. Furthermore, preferably, the inner annular ring 32 and the annular suspension ring 36 are integral, and formed of a single unitary member. The inner ring 32 is generally cylindrical in configuration, with its longitudinal axis coinciding with the longitudinal axis of the turbine rotor, and furthermore, inner ring 32 includes a radially inner surface 40, and a radially outer surface 42. The spacing between the radially inner surface 40 and the blade tips 24 is designated by the letter "t", and represents the tip clearance between the first stage rotor blade 16 and the shroud 30. It is the primary object of the subject invention to localize the cooling of the shroud so as to maintain a substantially uniform tip clearance "t" between the shroud and the first stage turbine rotor at all operating conditions of the turbine engine.

Figure 2:
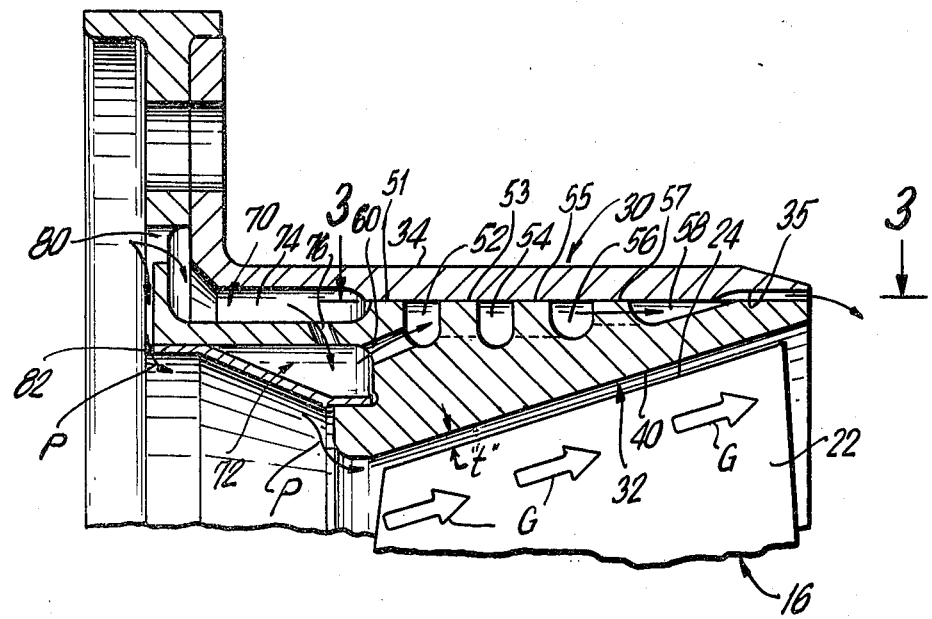
FIG. 2 is a partial sectional view of a first embodiment of an air-cooled shroud according to the subject invention.
Figure 3:
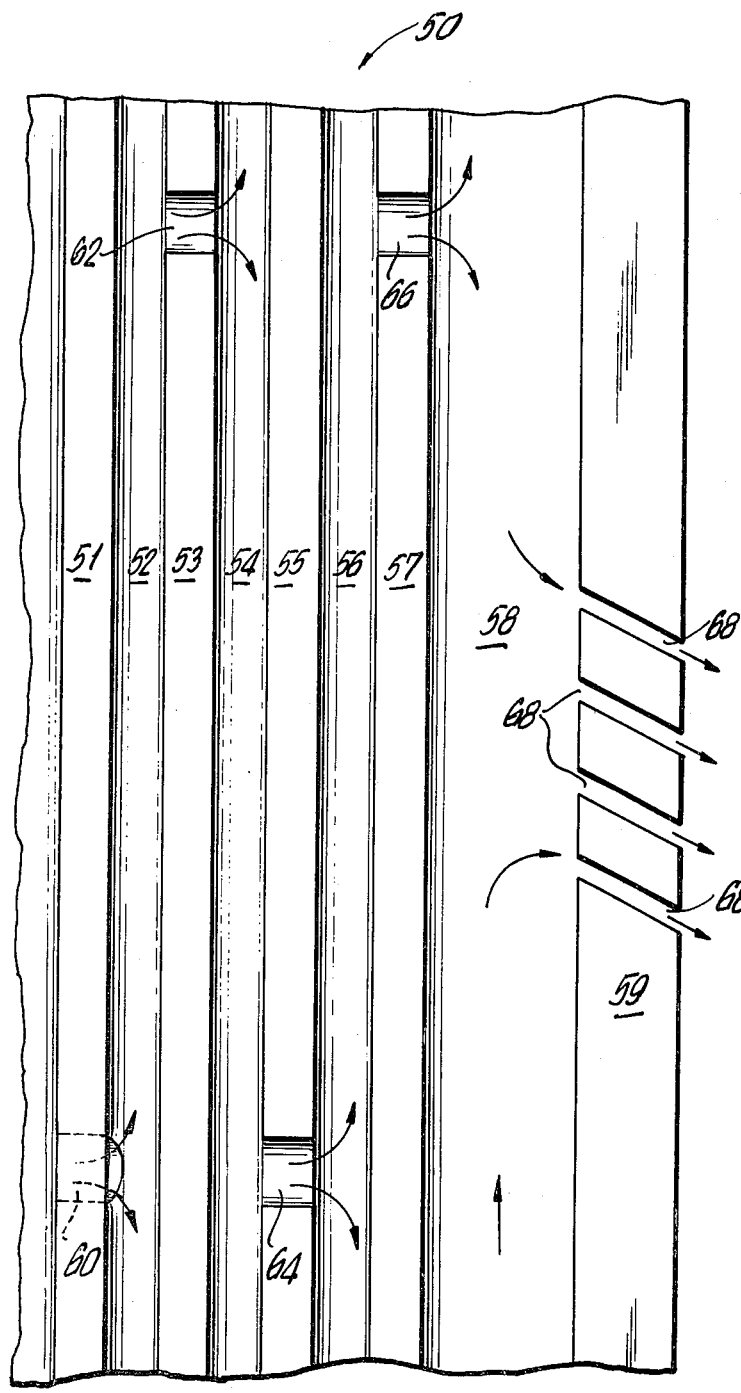
FIG. 3 is a cross-sectional view taken along line 3—3 in FIG. 2.

As illustrated in FIGS. 1–3, a matrix of grooves, designated by the numeral 50, is cut into the outer radial surface 42 of the inner ring, and forms a portion of a labyrinth of passageways for cooling of the shroud or cylinder 30. The matrix includes circumferential grooves 52, 54, 56, and 58 which are in spaced, parallel relationship, extend about the entire circumference of the inner ring, and are disposed generally perpendicular to the longitudinal axis thereof. The grooves are bordered by circumferentially extending barriers 51,53,55,57 and 59, with the leading edge of the matrix being defined by the barrier 51, while the trailing edge of the matrix is defined by barrier 59. As is shown in FIGS. 1 and 2, the width and depth of each groove 52–58 may be designed such that the cross-sectional areas of the circumferential grooves are substantially equal. By the arrangement of barriers 51, 53, 55, 57 and 59, the flow of pressurized cooling air through the matrix will be substantially uniform.

Referring to FIGS. 1 and 2, the leading edge barrier 51 includes a plurality of apertures 60 extending therethrough, which apertures 60 are preferably uniformly spaced about the entire circumference of the inner ring 32, with the apertures 60 providing communication between the first circumferential groove 52 and an entry flow path, designated by the numeral 70. The latter is defined by the outer restraining ring 34, the inner ring 32, and the suspension ring 36. The entry flow path 70 includes a plenum chamber 72 which is in communication with the apertures 60, as well as an entry chamber 74 in communication with the plenum chamber 72 via aperture 76. Cooling air provided from the compressor of the gas turbine engine is provided to the entry chamber 74 via opening 80, as shown in FIG. 2. Cool air from the compressor may also be provided via the opening 80 to a second opening 82 which is in communication with the combustion gas flow path. The flow of cooling air is designated by the letter "P" and effectively functions to purge hot gases disposed upstream of the inner ring 32, and in addition provides film air cooling to the region of the tip clearance "t" between the radial inner surface 40 of the inner ring 32 and the rotor blades 16.

Referring to FIG. 3, the matrix 50 also includes a plurality of arrays of interconnecting grooves 62, 64 and 66 extending generally parallel to the longitudinal exis of the inner ring, with each interconnecting groove extending through a barrier for providing communication between two adjacent circumferential grooves. As shown in FIG. 3, the array of interconnecting grooves provided in each barrier is staggered with respect to the array of interconnecting grooves in the adjacent barriers. Thus, interconnecting grooves 62 and 66 in the barriers 53 and 57 are in aligned relationships, but are staggered with respect to the intermediate interconnecting grooves 64. As in the case of the openings 60 provided in the leading edge barrier 51, the interconnecting grooves 62, 64 and 66 are spaced about the entire periphery of the inner ring 32, e.g., twelve interconnecting grooves, spaced at 30° intervals. Interconnecting grooves 68 are provided in the trailing edge barrier 59, and may be disposed at an angle with respect to the longitudinal axis of the inner ring. By this arrangement the cooling air exiting from the trailing edge of the matrix are provided with an initial swirl to substantially coincide with the flow path of the hot combustion gases downstream of the rotating blades 16. As shown in FIGS. 1 and 2, the outer restraint ring 34 is in line-to-line contact with the inner ring 32, and cooperates with and covers the matrix of grooves 50 to form a labyrinth of air-cooling passageways in the shroud 30. The trailing edge of the restraint ring 34 may include an undercut, designated by the numeral 35, to ensure that the interconnecting grooves 68 are of sufficient cross-sectional areas to prevent pressure buildup within the labyrinth of passageways.

In operation, pressurized cool air from the compressor of the gas turbine engine is provided to the opening 80 and then to the plenum chamber 72 for distribution through the array of interconnecting openings 60 in the labyrinth of passageways. As the cooling air passes through each interconnecting groove 60 (see FIG. 3), it encounters the barrier 53, and is thus effectively split so as to flow in two opposite lateral directions along the circumferential groove 52. Each air flow next encounters one of the array of interconnecting grooves 62 in the second barrier 53, and thus passes through the groove 62 into circumferential groove 54. The cycle of air flow is then repeated in the circumferential groove 54. By this arrangement, pressurized cooling air is effectively distributed over the entire circumference of the inner ring 32, thereby effecting convection cooling of the shroud 30. The pressurized cooling air is exhausted from the labyrinth of passageways through the angled interconnecting grooves 68 disposed in the trailing edge of the shroud 30. By this arrangement, tip clearance control between the shroud and the rotating blades 16 is achieved by convection cooling of the shroud and by the stress reaction of the inner cooled ring 32 and the outer restraint ring 34 which are disposed in line-to-line contact at assembly. In addition to the benefit of tip clearance control, the cooled shroud 30 is capable of tolerating increased turbine inlet temperatures which would not otherwise be possible with an uncooled shroud or cylinder. The convection cooling of the shroud reduces the level and gradient of metal temperatures in the shroud, and effectively attenuates thermal distortion of the shroud due to combustor hot spots. The cool shroud is thus able to maintain its integrity at higher gas temperatures resulting from various operating conditions of the gas turbine engine.

Figure 4:
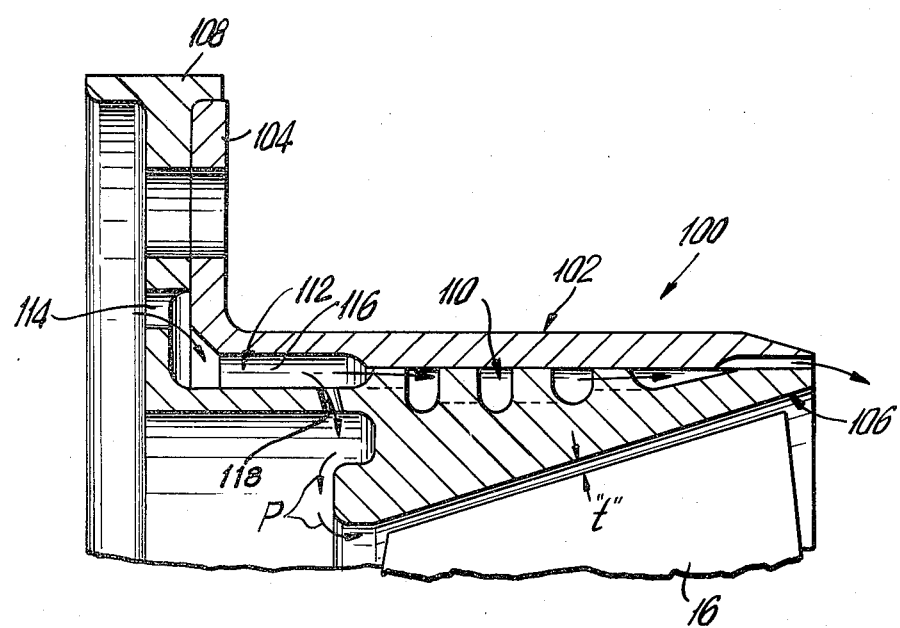
FIG. 4 illustrates a second embodiment of an air-cooled shroud of the subject invention.

Turning to FIG. 4, in the second embodiment of the subject invention, the air-cooled shroud 100 includes an outer, annular restraining ring 102 and an inner ring 106. The latter includes a matrix of grooves which, together with the restraining ring 102, define a labyrinth of passageways, designated by the numeral 110. The outer restraining ring 102 includes a flange portion 104 that cooperates with the flange portion 108 of the inner ring 106 to define entry flow path 112. The latter is in communication with the gas turbine compressor via opening 114 leading to a plenum chamber 116. The plenum chamber is in communication with the labyrinth of passageways 110, and includes orifices 118 disposed adjacent the leading edge of the inner ring 106. The flow of pressurized cool air through orifices 118 from the plenum chamber 116 is designated by the letter "P" and effectively functions as a flow of cool air for purging hot gases disposed upstream of the inner ring 106, and in addition provides film air cooling to the tip clearance "t" between the rotor blades 16 and the radial inner surface of the inner ring 106. Still further, by directing the airflow "P" from orifice 118 as shown in FIG. 4, the leading edge of the inner ring 106 may be impingement cooled. In the embodiment of the air-cooled shroud of FIG. 4, as in the case of the embodiment of FIGS. 1-3, a parallel flow of the pressurized cool air is achieved as the air progresses through the labyrinth of passageways 110 in the shroud. The pressurized cooling air enters the matrix of grooves defining the labyrinth of passageways at the leading edge of the shroud, i.e., the hottest metal area of the shroud, and progresses to the trailing edge thereby effecting convection cooling of the metal parts. The passageways interconnecting plenum chamber 116 to the labyrinth of passageways 110 in the embodiment of FIG. 4 are directly through the first barrier and may be formed with the labyrinth 110, as contrasted to the drilled openings 60 of the embodiment of FIGS. 1-3. The parallel flow of the cooling air provides the coldest cooling air at the hottest metal are in order to obtain a substantially uniform temperature level profile extending from the leading edge to the trailing edge of the shroud. As is readily appreciated, as the pressurized cooling air progresses through the labyrinth of passageways 110 its effective cooling capacity deteriorates due to the fact that the cooling air is increased in temperature as it progresses through the labyrinth of passageways.

The embodiments of the subject invention as shown respectively in FIGS. 5-6 and FIGS. 7-8 are particularly designed for use with a gas turbine engine having an annular combustion chamber outlet and wherein the flange support connection of the shroud is disposed adjacent the trailing edge of the shroud, with the shroud being cantilevered from a support arm extending from the flange to the leading edge of the shroud. Accordingly, by this arrangement, the flange support, as well as the contilevered suspension ring or support arm for the shroud, is disposed radially outwardly of the shroud, and is thus remote relative to the hot combustion gases passing through the turbine. This construction is in sharp contrast to the shroud support structures as shown in the embodiments of FIGS. 1-4 wherein the shroud support flanges are disposed adjacent the leading edge of the shroud.

Figure 5:
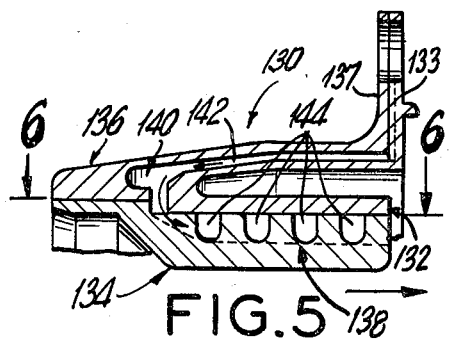
FIG. 5 illustrates a third embodiment of an air-cooled shroud according to the subject invention.
Figure 6:
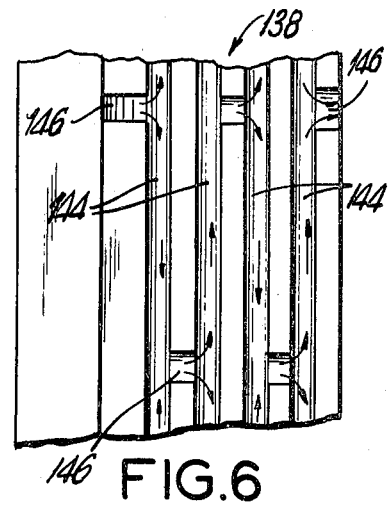
FIG. 6 is a cross-sectional view taken along line 6—6 in FIG. 5.

In the embodiments of FIGS. 5-6 and 7-8 it can readily be appreciated that there is a substantial temperature difference (and hence a substantial differential thermal growth) between the cantilevered support arm structure as compared to the shroud extending about the turbine rotor. This differential thermal growth is primarily compensated by the inherent flexure of the cantilevered arm support. In the embodiment as illustrated in FIGS. 5 and 6, the air-cooled shroud 130 includes a unitary, annular restraint ring 132, a unitary, annular inner ring 134, and a unitary, annular suspension ring 136. The inner ring 134 cooperates with the annular restraint ring 132 to define a labyrinth of passageways 138 for conducting pressurized cooling air therethrough. The three rings, 132, 134, and 136 cooperate to define the entry flow path 140 leading to the labyrinth of passageways 138, with the suspension ring 136 and the restraint ring 132 cooperating to define an elongated fluid flow passageway 142 leading to the entry flow path 140. The outer restraint ring 132 includes a flange portion 133, while the suspension ring flange 136 includes a flange portion 137. Flanges 133, 137 are suitably connected to support structure for the annular shroud. By this arrangement, the shroud is effectively cantilevered from the support flanges 133, 137 thereby providing a relatively flexible support connection for the shroud. Thus, any relative differential thermal growth between the structure defining the labyrinth 138 and the supporting arm is compensated for by flexure of the cantilevered support structure. Pressurized cooling air provided from the engine's compressor is ducted through the conduit 142 and thence through the entry flow path 140 for passage through the labyrinth 138. The latter includes circumferential grooves 144 and staggered interconnecting grooves 146 extending from the leading edge to the trailing edge of the inner ring 132. It is noted that, as shown in FIG. 5, the cross-sectional areas, as well as configurations of the circumferential grooves 144 are substantially equal thereby insuring a uniform mass flow of the pressurized cool air through the labyrinth of passageways.

Figure 7:
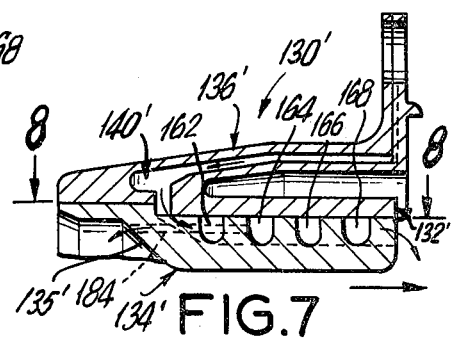
FIG. 7 is a cross-sectional view of a fourth embodiment of the subject invention.
Figure 8:
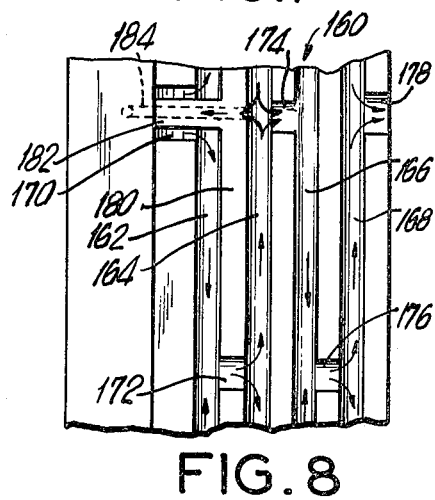
FIG. 8 is a cross-sectional view taken along line 8—8 in FIG. 7.

In the embodiment of the subject invention as illustrated in FIGS. 7 and 8, a cantilevered flange support is also provided for the inner and outer rings forming a portion of the air-cooled shroud. Outer restraining ring 132' and suspension ring 136' of the air-cooled shroud 130' is identical to the elements 132 and 136 in the embodiment of FIGS. 5-6. On the other hand, the inner ring 134' includes a labyrinth of passageways 160 having a plurality of annular, circumferentially-extending grooves 162-168 extending from the leading edge to the trailing edge of the inner ring 134'. Adjacent circumferential grooves are interconnected by interconnecting grooves, designated by the numerals 170-178. In order to provide both pressurized cooling air for passage through the labyrinth of passageways 160, as well as a flow of purge cooling air for film cooling of the tip clearance between the inner ring and the blade tips, the barrier 180 extending between the leading edge circumferential groove 162 and the contiguous circumferential groove 164 includes an extension 182 which is generally aligned with the longitudinal axis of the inner ring. Barrier extension 182 extends through the interconnecting groove 170 provided between the entry flow path 140' and the circumferential groove 162. A metered aperture 184 is provided in the extension barrier 182 and provides communication between the circumferential groove 164 and the radially inner surface 135' of the inner ring 134'. Each of the plurality of interconnecting grooves 170 extending about the circumference of the inner ring and providing communication between the entry flow path 140' and the leading edge groove 162 has a barrier extension 182 extending centrally therethrough, such that a corresponding plurality of metering apertures 184 are provided in the inner ring 134'. By this arrangement, as pressurized cool air passes from the leading edge groove 162, and then through the interconnecting groove 172 into the second circumferential groove 164, a portion of the cool air is directed through the next series of staggered interconnecting grooves 174, while the remaining portion of the pressurized cool air is redirected through a metered aperture 184 toward the radially inner leading edge 135' of the inner ring 134'. Accordingly, cooling air entering at the hot leading edge of the air-cooled shroud 130' flows through the labyrinth of passageways toward the middle of the shroud where some desired amount of the cooling air flow continues toward the trailing edge of the shroud, while the remaining portion of the cooling air is returned through the metering apertures 184 toward the leading edge of the shroud to purge hot gases from the upstream cavity of the shroud, and provide film air cooling to the tip clearance between the inner ring and the rotor blades.

Accordingly, there is provided a new and improved stationary air-cooled turbine shroud having restraint rings, and means for ducting pressurized cooling air therethrough to reduce the level and gradient of metal temperatures in the shroud, attenuate thermal distortion from combustor hot spots, and maintain the structural integrity of the shroud at elevated temperatures during the various modes of operation of the turbine engine. The means for ducting pressurized cooling air through the shroud is in the form of a labyrinth of passageways formed by a matrix configuration in an inner ring, and the cooperating line-to-line contact of an outer restraining ring, with the flow through the labyrinth of passageways being of a parallel flow type, or a split flow type. In the parallel flow type, cooling air enters the matrix at the leading edge of the shroud where the highest temperatures are experienced, and the pressurized cooling air flows toward the trailing edge in a circumferential array so as to provide complete circumferential cooling to the shroud. As the pressurized cooling air passes through the shroud, maximum convection cooling is achieved at the leading edge of the shroud with the overall result being a substantially level temperature profile of the shroud from the leading edge to the trailing edge. In the split flow configuration, as shown in the embodiment of FIGS. 7-8, pressurized cooling air enters at the relatively hot leading edge portion of the shroud, and flows downstream, where, at approximately the middle of the shroud, a metered amount of pressurized flow is redirected through suitable metering apertures in the labyrinth of passageways toward the leading edge of the shroud. The remaining portion of the pressurized air flow continues downstream. The redirected pressurized air flow purges the upstream cavity and film cools the shroud inner wall, and in particular, the tip clearance area between the shroud and the rotor blades.

In the several embodiments of the subject invention, the labyrinth of passageways in the shroud are formed from matrices cut into an inner ring, each matrix including a series of parallel, circumferential grooves having staggered interconnecting grooves so as to provide a labyrinth type flow path. The matrix which is cut into the inner ring is covered by the restraint ring, and further restraint to the leading edge portion of the inner ring is provided by a suspension ring which also cooperates with the restraining ring and the inner ring to define an entry flow cavity for pressurized cooling air received from the compressor of the gas turbine engine.

Although the invention has been described and illustrated with respect to several embodiments, it is readily apparent that those skilled in the art will be able to make numerous modifications of the exemplary embodiments without departing from the spirit and scope of the invention. All such modifications are intended to be included within the spirit and scope of the invention as defined by the appended claims.

What is claimed is:

1. A stationary air-cooled shroud forming a portion of a turbine assembly and extending over and spaced from the tips of a plurality of blades of a rotor, said shroud comprising:
   an inner ring having a radially inner surface and a radially outer surface, said inner surface being juxtaposed to and spaced from the blade tips, said outer surface of the inner ring having a matrix of grooves provided therein;
   an outer restraining ring concentric with and surrounding the inner ring and covering said matrix of grooves to form a labyrinth of air-cooling passageways; and
   a suspension ring which cooperates with the inner ring and the outer restraining ring to define an entry flow path for the cooling air provided to the labyrinth, said suspension ring and outer restraining ring defining a plenum chamber for receiving cooling air, said plenum chamber being in communication with the entry flow path leading to the labyrinth whereby the passage of a flow of cool air through said labyrinth is operative to reduce the level and gradient of thermal expansion of the shroud for obtaining improved turbine blade tip clearance control.

2. A stationary air-cooled shroud forming a portion of a turbine assembly and extending over and spaced from the tips of a plurality of blades of a rotor as in claim 1 wherein said suspension ring and said inner ring are formed of a unitary member.

3. A stationary air-cooled shroud forming a portion of a turbine assembly and extending over and spaced from the tips of a plurality of blades of a rotor as in claim 1 wherein said matrix of grooves includes:
   a plurality of spaced circumferential grooves extending generally perpendicular to the longitudinal axis of the inner ring; and
   a plurality of interconnecting grooves extending generally parallel to the longitudinal axis of the inner ring, each interconnecting groove providing communication between two adjacent circumferential grooves.

4. A stationary air-cooled shroud forming a portion of a turbine assembly and extending over and spaced from the tips of a plurality of blades of a rotor as in claim 3 wherein said spaced circumferential grooves are parallel.

5. A stationary air-cooled shroud forming a portion of a turbine assembly and extending over and spaced from the tips of a plurality of blades of a rotor as in claim 3 wherein each circumferential groove is of constant cross-sectional configuration.

6. A stationary air-cooled shroud forming a portion of a turbine assembly and extending over and spaced from the tips of a plurality of blades of a rotor as in claim 3 wherein the cross-sectional areas of the circumferential grooves are substantially equal.

7. A stationary air-cooled shroud forming a portion of a turbine assembly and extending over and spaced from the tips of a plurality of blades of a rotor as in claim 3 wherein said matrix of grooves includes at least first, second, and third spaced parallel, circumferential grooves respectively extending from the upstream to the downstream portion of the shroud, and wherein said inner ring further includes a leading edge disposed adjacent the upstream portion of the shroud, said inner ring having metering apertures extending between said second circumferential groove and the leading edge of said inner ring for providing film cooling to the inner radial surface of said inner ring.

8. A stationary air-cooled shroud forming a portion of a turbine assembly and extending over and spaced from the tips of a plurality of blades of a rotor as in claim 3 wherein the interconnecting grooves extending between two adjacent pairs of circumferential grooves are staggered about the circumference of the inner ring.

9. A stationary air-cooled shroud forming a portion of a turbine assembly and extending over and spaced from the tips of a plurality of blades of a rotor as in claim 3 wherein said labyrinth includes a trailing edge portion from which the flow of cooling air exits the labyrinth, and wherein the interconnecting grooves at the trailing edge of the labyrinth are disposed at an angle to the longitudinal axis of the inner ring.

10. A stationary air-cooled shroud forming a portion of a turbine assembly and extending over and spaced from the tips of a plurality of blades of a rotor as in claim 1 wherein said inner ring is a unitary member.

11. A stationary air-cooled shroud forming a portion of a turbine assembly and extending over and spaced from the tips of a plurality of blades of a rotor as in claim 1 wherein the outer restraining ring is a unitary member.

12. A stationary air-cooled shroud forming a portion of a turbine assembly and extending over and spaced from the tips of a plurality of blades of a rotor as in claim 1 wherein the plenum chamber includes orifices for providing film cooling air to the space between the radially inner surface of the inner ring and the blade tips.

13. A stationary air-cooled shroud forming a portion of a turbine assembly and extending over and spaced from the tips of a plurality of blades of a rotor, said shroud comprising:
- an inner ring having a radially inner surface and a radially outer surface, said inner ring being juxtaposed to and spaced from the blade tips, said outer surface of the inner ring having a matrix of grooves provided therein, said matrix including a plurality of parallel, spaced circumferential grooves extending generally perpendicular to the longitudinal axis of the ring, and a plurality of interconnecting grooves extending generally parallel to the longitudinal axis of the inner ring, each interconnecting groove providing communication between two adjacent circumferential grooves;
- an outer restraining ring concentric with and surrounding the inner ring and covering said matrix of grooves to form a labyrinth of air-cooling passageways; and
- a suspension ring integral with said inner ring, which suspension ring cooperates with the inner ring and the outer restraint ring to define an entry flow path for providing cooling air to the labyrinth, said suspension ring and outer restraining ring defining a plenum chamber for receiving cooling air, said plenum chamber being in communication with the entry flow path leading to the labyrinth for providing cooling air to the labyrinth for reducing the level and gradient of thermal expansion of the shroud in order to obtain improved turbine blade tip clearance control.

14. A stationary air-cooled shroud forming a portion of a turbine assembly and extending over and spaced from the tips of a plurality of blades of a rotor as in claim 13 wherein said suspension ring is a unitary member, said inner ring is a unitary member, and said outer restraining ring is a unitary member.

15. A stationary air-cooled shroud forming a portion of a turbine assembly and extending over and spaced from the tips of a plurality of blades of a rotor as in claim 13 wherein each circumferential groove is of constant cross-sectional configuration.

16. A stationary air-cooled shroud forming a portion of a turbine assembly and extending over and spaced from the tips of a plurality of blades of a rotor as in claim 13 wherein the cross-sectional areas of the circumferential grooves are substantially equal.

17. A stationary air-cooled shroud forming a portion of a turbine assembly and extending over and spaced from the tips of a plurality of blades of a rotor as in claim 13 wherein the interconnecting grooves extending between two adjacent pairs of circumferential grooves are staggered about the circumference of the inner ring.

18. A stationary air-cooled shroud forming a portion of a turbine assembly and extending over and spaced from the tips of a plurality of blades of a rotor as in claim 13 wherein said labyrinth includes a trailing edge portion from which the flow of cooling air exits the labyrinth, and wherein the interconnecting grooves at the trailing edge of the labyrinth are disposed at an angle to the longitudinal axis of the inner ring.

19. A stationary air-cooled shroud forming a portion of a turbine assembly and extending over and spaced from the tips of a plurality of blades of a rotor as in claim 13 wherein said plenum chamber includes an orifice for providing film cooling air to the space between the radially inner surface of the inner ring and the blade tips.

20. A stationary air-cooled shroud forming a portion of a turbine assembly and extending over and spaced from the tips of a plurality of blades of a rotor, said shroud comprising:
- an inner ring having a radially inner surface and a radially outer surface, said inner surface being juxtaposed to and spaced from the blade tips, said outer surface of the inner ring having a matrix of grooves provided therein, said matrix including at least first, second, and third spaced, parallel circumferential grooves extending generally perpendicular to the longitudinal axis of the inner ring from the upstream to the downstream portion of the shroud, and a plurality of interconnecting grooves extending generally parallel to the longitudinal axis of the inner ring, each interconnecting groove providing communication between two adjacent circumferential grooves, and wherein said inner ring further includes a leading edge disposed adjacent the upstream portion of the shroud, said inner ring having metering apertures extending between said second circumferential groove and the leading edge of the inner ring for providing film cooling to the inner radial surface of said inner ring;
- an outer restraining ring concentric with and surrounding the inner ring and covering said matrix of grooves to form a labyrinth of air-cooling passageways; and
- a suspension ring which cooperates with the inner ring and the restraint ring to provide an entry flow path for the cooling air provided to the labyrinth, whereby the passage of a flow of cool air through said labyrinth is operative to reduce the level and gradient of thermal expansion of the shroud for obtaining improved turbine blade tip clearance control.

21. A stationary air-cooled shroud forming a portion of a turbine assembly and extending over and spaced from the tips of a plurality of blades of a rotor as in claim 20 wherein said inner ring is a unitary member, said outer restraining ring is a unitary member, and said suspension ring is a unitary member.

22. A stationary air-cooled shroud forming a portion of a turbine assembly and extending over and spaced from the tips of a plurality of blades of a rotor as in claim 20 wherein each circumferential groove is of constant cross-sectional configuration.

23. A stationary air-cooled shroud forming a portion of a turbine assembly and extending over and spaced from the tips of a plurality of blades of a rotor as in claim 20 wherein the cross-sectional areas of the circumferential grooves are substantially equal.

24. A stationary air-cooled shroud forming a portion of a turbine assembly and extending over and spaced from the tips of a plurality of blades of a rotor as in claim 20 wherein the interconnecting grooves extending between two adjacent pairs of circumferential grooves are staggered about the circumference of the inner ring.

25. A stationary air-cooled shroud forming a portion of a turbine assembly and extending over and spaced from the tips of a plurality of blades of a rotor as in claim 20 wherein said labyrinth includes a trailing edge portion from which the flow of cooling air exits the labyrinth, and wherein the interconnecting grooves at the trailing edge of the labyrinth are disposed at an angle to the longitudinal axis of the inner ring.

* * * * *

UNITED STATES PATENT AND TRADEMARK OFFICE
CERTIFICATE OF CORRECTION

PATENT NO. : 4,280,792
DATED : July 28, 1981
INVENTOR(S) : Edward O. Hartel and John N. Dale It is certified that error appears in the above-identified patent and that said Letters Patent are hereby corrected as shown below:

In Abstract, line 11, it should read "flow" instead of "fow".

Column 5, line 27, it should read "area" instead of "are".

Signed and Sealed this

Eighth Day of December 1981

[SEAL]

Attest:

Attesting Officer

GERALD J. MOSSINGHOFF

Commissioner of Patents and Trademarks